R. L. BOYD.
LOAD BINDER.
APPLICATION FILED AUG. 3, 1910.
Reissued Nov. 8, 1910. 13,164.
FIG. 1.
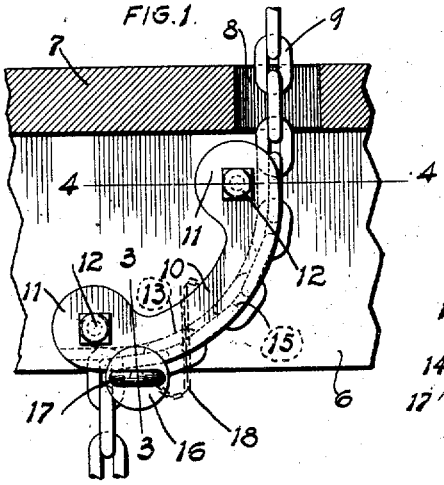
FIG. 2
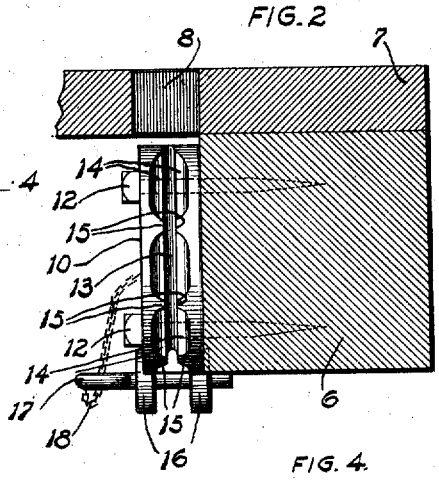
FIG. 4.
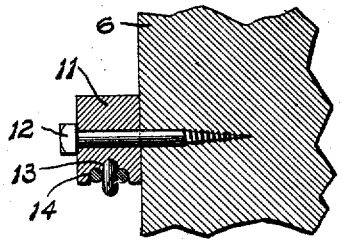
FIG. 3
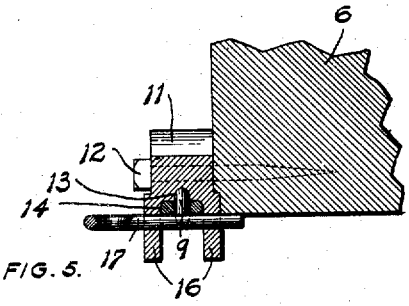
FIG. 5.
FIG. 6
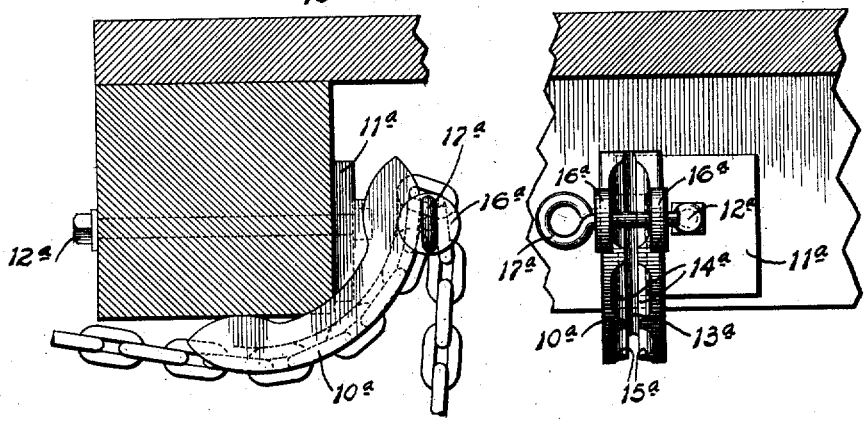
WITNESSES
Hm. Janus.
F. W. Harrington.
INVENTOR
ROBERT L. BOYD
BY J. N. Cornwall ATTY.
THE NORRIS PETERS CO., WASHINGTON, D. C.

UNITED STATES PATENT OFFICE.

ROBERT LEE BOYD, OF ALEXANDRIA, LOUISIANA.

LOAD-BINDER.

13,164. Specification of Reissued Letters Patent. Reissued Nov. 8, 1910.

Original No. 931,710, dated August 17, 1909, Serial No. 467,274. Application for reissue filed August 3, 1910. Serial No. 575,387.

*To all whom it may concern:*

Be it known that I, ROBERT LEE BOYD, citizen of the United States, residing at Alexandria, in the parish of Rapides and State of Louisiana, have invented certain new and useful Improvements in Load-Binders, of which the following is a specification.

This invention relates to binders and more particularly to that class used on flat cars, wagons or the like, wherein chains are used to retain the load, such as logs, lumber, sugar cane or similar articles.

The objects of this invention are to form a secure and positive grip of the chain, at the same time to overcome the undue strain and possibility of breaking the chain at the point of attachment.

Further objects and advantages will be apparent from the following specification and drawing thereof in which—

Figure 1 is a side elevation of the device shown bolted to the inside face of a car sill. Fig. 2 is an edge view thereof. Fig. 3 is a section on the line 3—3 of Fig. 1. Fig. 4 is a section on the line 4—4 of Fig. 1. Fig. 5 is a side elevation of modified form showing the sill in cross section. Fig. 6 is an edge view of Fig. 5.

Referring specifically to the drawings, 6 indicates a car sill supporting the flooring 7, having an aperture 8 through which the chain 9 passes after having been drawn about the load to be bound.

A fastener in the form of the arcuate member 10 has enlarged ends 11, which are drilled to receive bolts or log screws 12 to attach the same to the sill. The outer surface or periphery of the fastener is grooved as at 13, said groove being deep enough to allow the chain 9 to be embedded to about two thirds of the width of the links of said chain. At intervals the walls formed by the groove 13 are rabbeted as at 14 to receive the side members of the links of the chain 9 which lie in perpendicular planes to those occupying the groove 13, said rabbets forming shoulders 15 which bear the strain exerted thereon by the several links of the chain.

Near one of the enlarged ends 11 of the member 10 and integral therewith are lugs or ears 16 in which holes are formed to receive a slidable pin 17, said pin being fastened to the arcuate member by chain 18 which prevents loss thereof. The holes in the ears 16 are so drilled or formed as to cause the pin 17 to cross transverse to and outside of the chain 9 and between the ends of alternate links of the chain, being the links lying in a parallel plane with respect to the side of the fastener, thereby holding the end of the chain in engagement with the recesses 14 and shoulders 15.

In Figs. 5 and 6 are shown views of a modified form of my invention, the arcuate member $10^a$ being similar with respect to the groove $13^a$, the recesses $14^a$ and the shoulder $15^a$, also ears $16^a$, which are located preferably near upper end of the arcuate member and pin $17^a$, but the attaching device, instead of enlarged ends, consists of a flange or portion $11^a$ formed integral with the member $10^a$ and bent at a right angle with respect thereto. A hole is drilled through the portion $11^a$ to receive the bolt $12^a$ which secures the member $10^a$ to the sill $6^a$. In this form the arcuate member $10^a$ is perpendicular to the sill while in my other form the member 10 is parallel to the sill.

In the use of my invention it will be assumed that one end of the chain is made fast to either a duplicate of my fastener or may be attached to the sill by any other means. The chain is drawn about the logs or the like to be bound, either passed through the aperture in the flooring or around and under the sill, as the case requires. The chain is drawn taut and placed into the fastener, shoulders 15 sustaining the strain; then the pin 17 is placed through the ears 16, which pin prevents the chain becoming loosened or accidentally released. To release the chain the pin 17 is withdrawn, the chain removed from the grooves in the fastener member and thereby made loose.

I claim:

1. A chain holder for load-binders, comprising a member having a grooved arcuate periphery, said groove being so shaped as to receive the links of a chain, and a pin extending transversely of the holder, and adapted to engage between alternate links of a chain.

2. A chain holder for load-binders, comprising a member having a grooved arcuate periphery, the grooves being so shaped as to receive the links of a chain, said member being adapted to be attached to a sill and to support a pin, and a pin extending transversely of the holder adapted to engage between alternate links of a chain.

3. A chain holder for load-binders comprising a member having a chain groove on its outer side to receive the links of a chain, and a pin passing through said member adapted to hold a chain in the groove.

4. A chain holder for load-binders comprising an arcuate member having apertured ears spaced to receive a chain therebetween, a pin slidable through the apertures in said ears, to hold a chain to said member, between said ears.

5. A chain holder for load-binders, comprising an arcuate member having a chain groove in its outer surface and perforated ears on opposite sides of said groove, and a pin which is slidable through the perforations in said ears and across the groove to hold a chain therein.

ROBERT LEE BOYD.

Witnesses:

H. T. WADLEY,

J. HARTIG.